(12) United States Patent
McDavid, Jr.

(10) Patent No.: US 6,800,955 B2
(45) Date of Patent: Oct. 5, 2004

(54) FLUID-POWERED ENERGY CONVERSION DEVICE

(76) Inventor: William K. McDavid, Jr., 5665 Ward La., Wilson, WY (US) 83014

(*) Notice: Subject to any disclaimer, the term of this patent is extended or adjusted under 35 U.S.C. 154(b) by 126 days.

(21) Appl. No.: 10/260,206

(22) Filed: Sep. 30, 2002

(65) Prior Publication Data

US 2003/0025334 A1 Feb. 6, 2003

Related U.S. Application Data

(63) Continuation-in-part of application No. 09/872,690, filed on May 31, 2001, now Pat. No. 6,518,680.

(51) Int. Cl.[7] .................................. F03D 3/00
(52) U.S. Cl. ....................... 290/54; 290/43; 290/44; 290/55
(58) Field of Search ....................... 290/43, 44, 54, 290/55; 60/398; 415/2.1, 4.2

(56) References Cited

U.S. PATENT DOCUMENTS 5,664,418 A * 9/1997 Walters ........................ 60/398
6,518,680 B2 * 2/2003 McDavid, Jr. ............... 290/54
6,710,469 B2 * 3/2004 McDavid, Jr. ............... 290/55

* cited by examiner

Primary Examiner—Nicholas Ponomarenko
(74) Attorney, Agent, or Firm—Steven W. Smith (57) ABSTRACT

A fluid-powered energy conversion device converts energy in a moving fluid into mechanical energy. A rigid cylindrical frame of toroidal baffles forms an upstream annular chamber and a downstream annular chamber, each of the chambers having open sides to allow entry of the fluid. The toroidal baffles create an upstream drive vortex in an upstream central vortex chamber, and a downstream extraction vortex rotating in the opposite direction in a downstream central vortex chamber. A plurality of hinged louvers surround the vortex chambers and allow the fluid to enter each chamber only in the direction of vortex rotation, and prevent the fluid from exiting through the sides of the device. The drive vortex passes through and rotates a turbine in a central aperture between the chambers. The turbine is rotated by rotational momentum of the drive vortex, lift from each turbine blade, and additional momentum imparted by the vortex reversal.

29 Claims, 7 Drawing Sheets

FLUID-POWERED ENERGY CONVERSION DEVICE

RELATED APPLICATIONS

This application is a continuation in part of and co-owned U.S. patent application Ser. No. 09/872,690 entitled, "Fluid-Powered Energy Conversion Device", filed May 31, 2001, now U.S. Pat. No. 6,518,680, in the name of William K. McDavid, Jr.

BACKGROUND OF THE INVENTION

1. Technical Field of the Invention

The present invention relates generally to electrical generation and energy conversion devices, and more particularly to a fluid-powered energy conversion device that converts the energy of wind or flowing water to mechanical or electrical energy.

2. Description of Related Art

The use of wind or flowing water to provide power for various uses dates back many centuries. In modern times, wind and water have been used to generate electricity. Hydroelectric generating plants have been used to generate large quantities of electrical energy for widespread distribution. However, this requires major permanent environmental changes to the areas where dams are built and reservoirs rise. Wind-powered devices, in general, have been used to perform mechanical work, or to generate electricity, only on a limited scale. With the ever increasing demand for additional or alternative energy sources, all possible sources are being given more scrutiny. This is particularly true for sources that are non-polluting and inexhaustible. Free-flowing hydro-electric and wind-powered systems provide such sources, and the capturing of increased energy from wind and water has received much consideration.

Commercial hydro-electric and wind-powered electrical generation devices that are currently in use, however, have several disadvantages. Wind-powered devices, in particular, are expensive, inefficient, dangerous, noisy, and unpleasant to be around. To capture a large volume of wind, existing wind-powered devices are very large. As a result, they cannot be distributed throughout population centers, but must be installed some distance away. Then, like dams with hydro-electric generators, the electrical energy they generate must be transmitted, at considerable cost and with considerable lost energy, to the population centers where the energy is needed.

It would be desirable to distribute smaller water-powered and wind-powered units throughout the population centers. For example, it would be desirable to have a wind-powered unit for each building structure, thus distributing the generating capacity over the entire area, and making the energy supply less vulnerable to local events such as storms or earthquakes. Such distributed generation would also solve the most common and valid objection to wind power, that is, that the wind does not always blow. In a large geographical area, however, wind is almost always blowing somewhere. Therefore, with wind-powered generators distributed throughout the area, power could be generated in the areas where the wind is blowing, and then transmitted to the rest of the power grid. However, with existing technology, smaller units suitable for distributing throughout a population area are not efficient enough to provide a sufficient amount of energy to power a structure such as a house or office building. In addition, such units are visually obtrusive and noisy, making them unsuitable for use in residential or other highly populated settings.

Existing wind-powered electrical generation devices commonly utilize a propeller mounted on the horizontal shaft of a generator which, in turn, is mounted at the top of a tower. This is an inefficient design because energy is extracted from the wind by reducing the wind velocity as it passes through the propeller. This creates a pocket of slow-moving air centered behind the propeller, which the ambient wind blows around. Therefore, only the outer portion of the propeller blades use the wind efficiently.

To counter this effect, modern windmill designs utilize extremely long propeller blades. The use of such massive blades, however, has its own disadvantages. First, the propellers are known to kill or injure thousands of large birds each year. Second, the massive blades can be dangerous if the device fails structurally and the propeller breaks loose. In this case, the propeller can fly a considerable distance and cause serious damage or injury to anything or anyone in its path. Third, the propeller design contains an inherent gravitational imbalance. The rising blades on one side of the propeller's hub are opposing gravity, while the descending blades on the other side of the hub are falling with gravity. This imbalance creates a great deal of vibration and stress on the device. At great expense, consequently, the device must be structurally enhanced to withstand the vibration and stress, and thus avoid frequent maintenance and/or replacement.

It would therefore be advantageous to have a fluid-powered energy conversion device that overcomes the shortcomings of existing devices. Such a device could utilize wind energy or the energy of flowing water to provide mechanical energy or electrical energy. The present invention provides such a device.

SUMMARY OF THE INVENTION

In one aspect, the present invention is a fluid-powered energy conversion device for converting energy in a moving fluid into mechanical energy. The device includes a rigid cylindrical frame having an upstream annular chamber and a downstream annular chamber. Each of the chambers has sides that are open to allow entry of the moving fluid. A first plurality of baffles are longitudinally mounted in the upstream chamber, and operate to create in the upstream chamber, an upstream drive vortex rotating in a first direction when the moving fluid enters the upstream chamber through the upstream chamber's open sides. A first plurality of hinged louvers are positioned in the openings between the first plurality of baffles, and encircle an upstream central vortex chamber centered around a central longitudinal axis of the device. The first plurality of louvers permit entry of the moving fluid into the upstream central vortex chamber only when the fluid is rotating in the first direction. They also prevent the fluid from exiting the upstream central vortex chamber through the sides of the device. The device also includes a floor of the upstream annular chamber that slopes toward the downstream chamber as the floor approaches the central longitudinal axis of the device. The sloping floor causes the drive vortex to flow downstream through the upstream central vortex chamber and pass through a central aperture located between the upstream annular chamber and the downstream annular chamber. A longitudinal drive shaft is centrally mounted in the central aperture, and a turbine is mounted on the drive shaft in the central aperture. The turbine is rotated by the drive vortex as the drive vortex passes through the central aperture.

The device may also include a second plurality of baffles longitudinally mounted in the downstream chamber that operate to create a downstream extraction vortex rotating in a direction opposite to the first direction when the moving fluid enters the downstream chamber through the downstream chamber's open sides. Additionally, a second plurality of hinged louvers may be positioned in the openings between the second plurality of baffles, encircling a downstream central vortex chamber. The second plurality of louvers permit entry of the moving fluid into the downstream central vortex chamber only when the fluid is rotating in the direction opposite to the first direction. They also prevent the fluid from exiting the downstream central vortex chamber through the sides of the device. In this manner, the turbine is rotated by the drive vortex as the drive vortex passes through the turbine and reverses direction to match the direction of the extraction vortex.

For high-wind conditions and when utilized with water, the drive vortex and extraction vortex may rotate in the same direction. The first plurality of hinged louvers encircle the upstream central vortex chamber, and the second plurality of hinged louvers encircle the downstream central vortex chamber. The first plurality of louvers permit entry of the wind or water into the upstream central vortex chamber only when the fluid is rotating in the first direction. Likewise, the second plurality of louvers permit entry of the wind or water into the downstream central vortex chamber only when the fluid is rotating in the first direction. Both sets of louvers also prevent the fluid from exiting the vortex chambers through the sides of the device.

BRIEF DESCRIPTION OF THE DRAWINGS

The invention will be better understood and its numerous objects and advantages will become more apparent to those skilled in the art by reference to the following drawings, in conjunction with the accompanying specification, in which.

In the drawings, like or similar elements are designated with identical reference numerals throughout the several views thereof, and the various elements depicted are not necessarily drawn to scale.

DETAILED DESCRIPTION OF EMBODIMENTS

Figure 1:
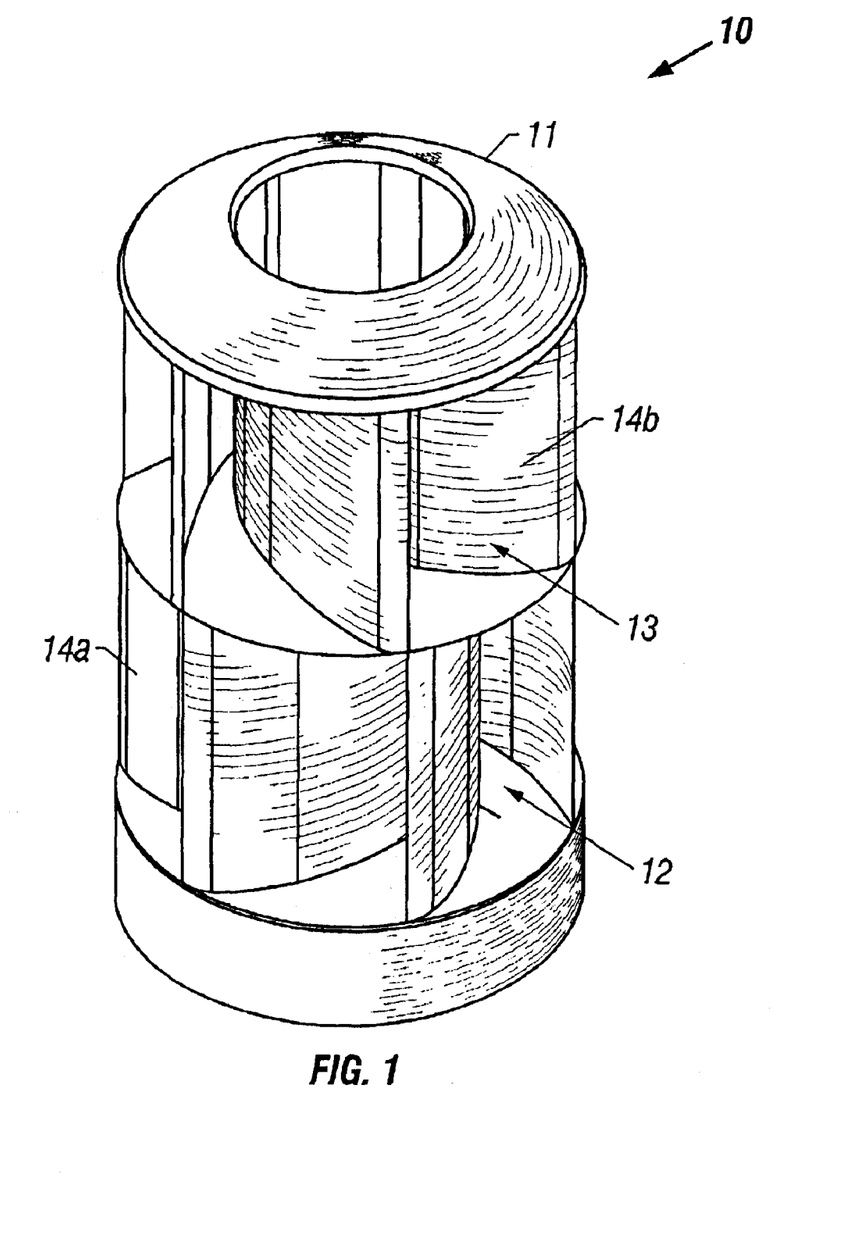
FIG. 1 is a perspective view of a first embodiment of the present invention that converts wind energy to mechanical or electrical energy.

FIG. 1 is a perspective view of an embodiment of the present invention that converts wind energy to mechanical or electrical energy. The energy conversion device 10 includes a stationary cowling 11 surrounding an upstream annular chamber 12 and a downstream annular chamber 13. The cowling may be constructed of any suitable rigid material such as wood, plastic, metal, and so on. Furthermore, the cowling may be fabricated from a transparent material, making the device visually unobtrusive. In the preferred embodiment of the present invention, the cowling is cylindrical and is constructed of a high-grade, ultraviolet-protected plastic.

The cowling 11 includes a plurality of longitudinal baffles that are curved and arranged in a toroidal pattern. Upstream baffles 14a are mounted in the upstream annular chamber 12, and downstream baffles 14b are mounted in the downstream annular chamber 13. In the preferred embodiment of the present invention, approximately six toroidal longitudinal baffles are mounted in each chamber. The baffles function to guide ambient wind into each chamber. The narrowing cross-sectional area between the baffles causes the air to accelerate as it moves toward the center of the device, creating two high-velocity vortices (an upstream drive vortex and a downstream extraction vortex). Although the invention is described herein primarily as a vertically oriented cylinder, it should be understood that the device may be installed in other orientations, such as a horizontal orientation, that result in the device having an upstream annular chamber and a downstream annular chamber that are at the same height. Alternatively, as noted below in connection with FIG. 7, the device may be inverted when used in water since water vortices more readily move downward rather than upward.

In the embodiment illustrated in FIG. 1, in which low-speed wind is the input energy source, the upstream baffles 14a and the downstream baffles 14b are curved in opposite directions. The baffles therefore create two high-velocity vortices which rotate in opposite directions. As described below in connection with FIG. 4, the direction of the vortex flow is reversed in a turbine located between the upstream annular chamber 12 and the downstream annular chamber 13, thereby adding additional rotational power to the turbine. In the hydro-electrical embodiment in which flowing water is the input energy source, and in high-speed wind conditions such as when the device is mounted on a vehicle, the upstream baffles and the downstream baffles may be curved in the same direction. In these embodiments, therefore, the baffles create two high-velocity vortices which rotate in the same direction. The device may be converted from a low-wind device to a high-wind device by removing the counter-rotational downstream annular chamber 13 and replacing it with a downstream annular chamber that creates a vortex rotating in the same direction as the drive vortex.

In the preferred embodiment of the present invention, plastic mesh (not shown) may surround the entry and exit openings of the cowling 11 to prevent birds, animals, or debris from entering the device 10. In addition, should the device fail structurally, any broken parts are contained by the mesh instead of flying out into the vicinity and causing damage or injury.

Figure 2:
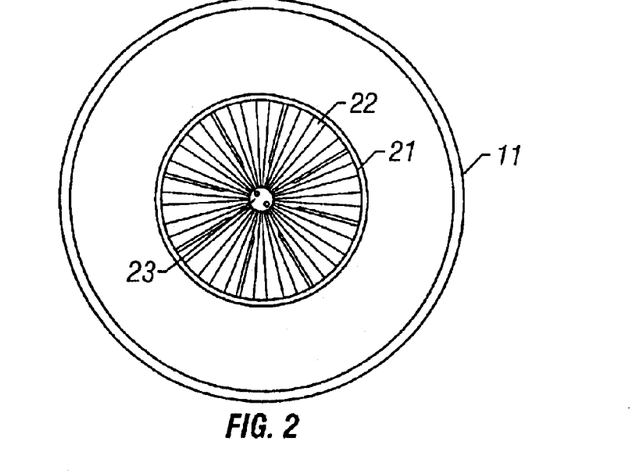
FIG. 2 is a top plan view of the embodiment of FIG. 1.

FIG. 2 is a top plan view of the embodiment of FIG. 1. The top of the cowling 11 includes a central aperture 21 through which the air in the extraction vortex exits the device. In the preferred embodiment, the extraction vortex exits the device rotating in a counter-cyclonic direction (clockwise in the Northern Hemisphere) so that it dissipates rather than creating potentially damaging whirlwinds. The turbine 22 is visible through the aperture. The turbine rotates around a central drive shaft 23.

Figure 3:
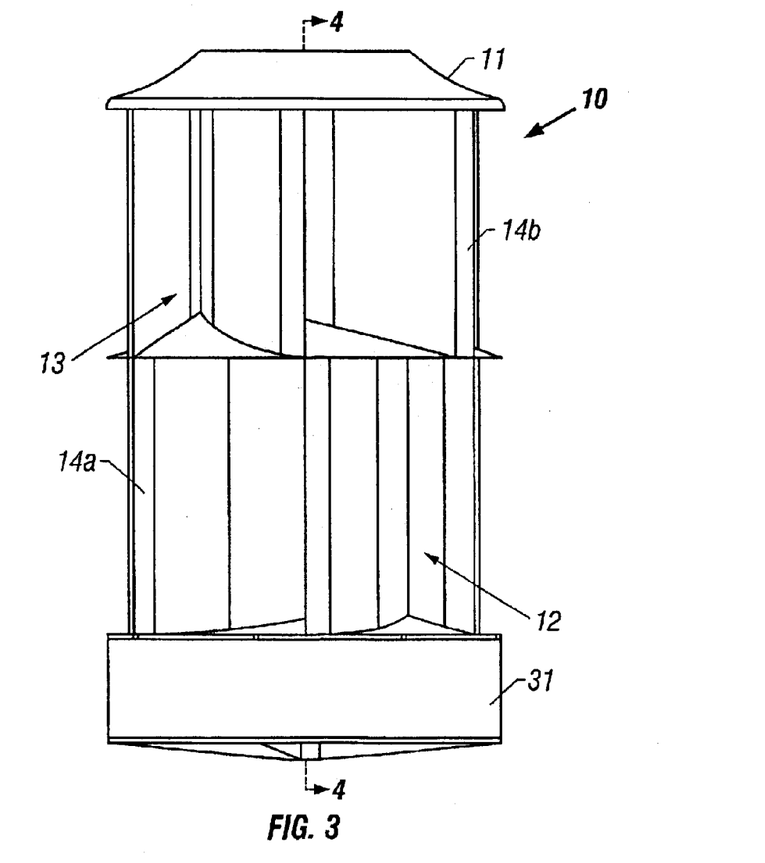
FIG. 3 is a side elevational view of the embodiment of FIG. 1.

FIG. 3 is a side elevational view of the embodiment of FIG. 1 illustrating an exemplary elevational profile of the cowling 11, the upstream annular chamber 12, the downstream annular chamber 13, and the baffles 14a and 14b. The cowling may mount upon a base 31. The base may be utilized to enclose additional mechanical assemblies such as a flywheel and/or an electrical generator.

Figure 4:
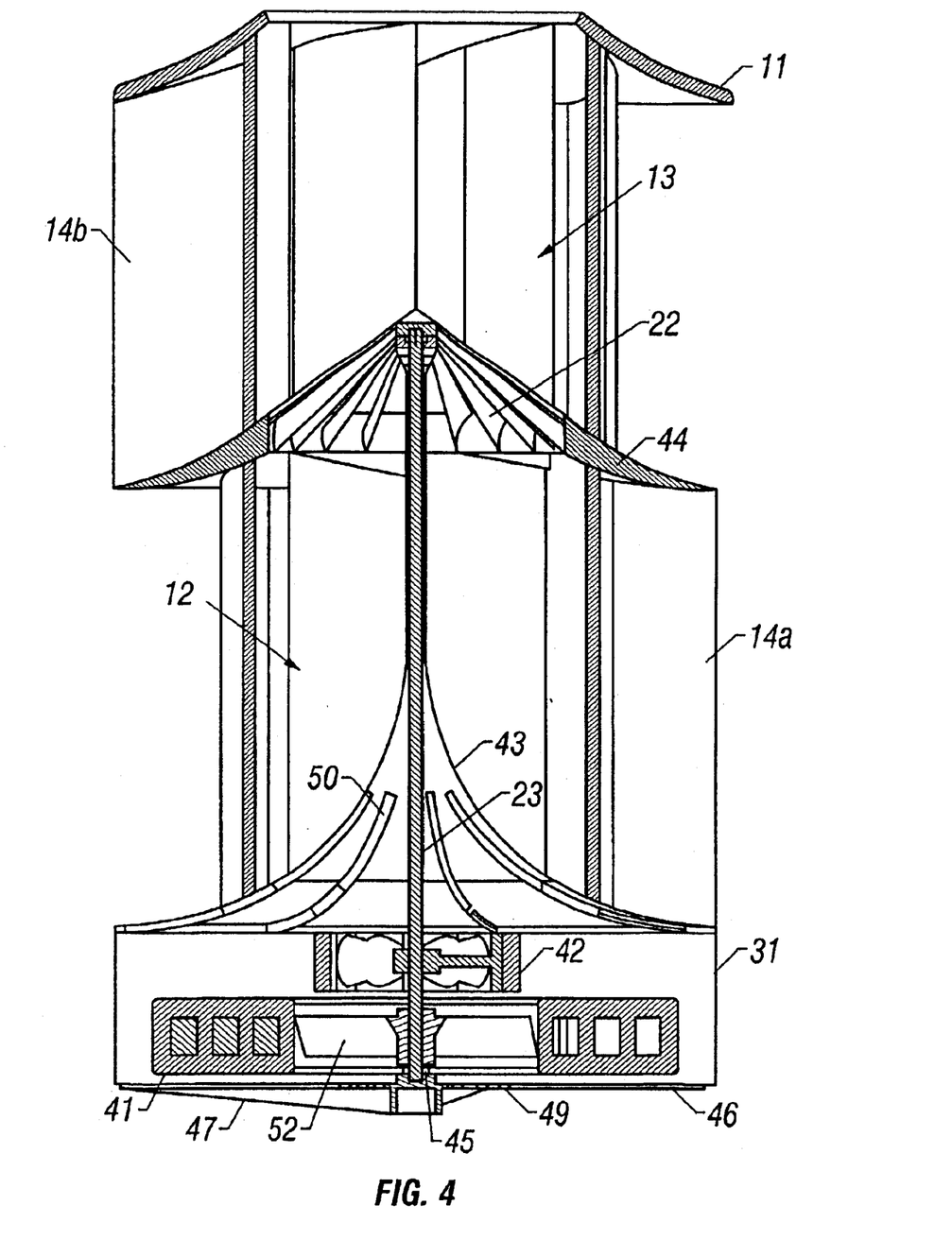
FIG. 4 is a cross-sectional view of the embodiment of FIG. 1 taken along line 4—4 of FIG. 3 with an electrical generator installed to produce electrical energy.

FIG. 4 is a cross-sectional view of the embodiment of FIG. 1 taken along line 4—4 of FIG. 3 with a flywheel 41 installed in the base 31 along with an electrical generator 42 to produce electrical energy. Ambient wind flows simultaneously into the upstream annular chamber 12 through upstream baffles 14a, and into the downstream annular chamber 13 through the downstream baffles 14b through the sides of the cowling 11. The baffles guide the ambient wind towards the center of the device 10. A sloping parabolic floor (deck) 43 of the upstream annular chamber 12 causes the wind to flow downstream into the centrally mounted turbine 22 that rotates on the central drive shaft 23. The device 10 produces power by guiding ambient wind flows into two high-velocity vortices arranged upstream and downstream of the turbine which converts the wind flows to mechanical energy by turning the drive shaft 23. High RPM and high torque are produced by the turbine due to three primary factors: (1) each blade of the turbine is shaped like a scoop which captures the rotational momentum of the drive vortex; (2) each blade of the turbine has a cross-sectional shape of an airfoil that generates lift in the direction of rotation of the turbine; and (3) in low wind conditions, the reversal of the direction of the vortex rotation adds additional force to the turbine in the direction of rotation.

The large flywheel 41 may be attached to the rotating turbine drive shaft 23. In one embodiment, the flywheel may be a permanent magnet, surrounded by copper windings. The flywheel may serve both as an internal energy storage device due to its angular momentum, and as a dynamo for the generator 42 mounted under the deck 43 of the upstream annular chamber 12. A solid-state electronic regulator (not shown) may be utilized to control the electrical current load. The regulator maintains a zero load until a preset rotational velocity (RPM) is reached. The load is then increased in order to generate electricity while maintaining the RPM of the turbine at a preselected level.

Figure 5:
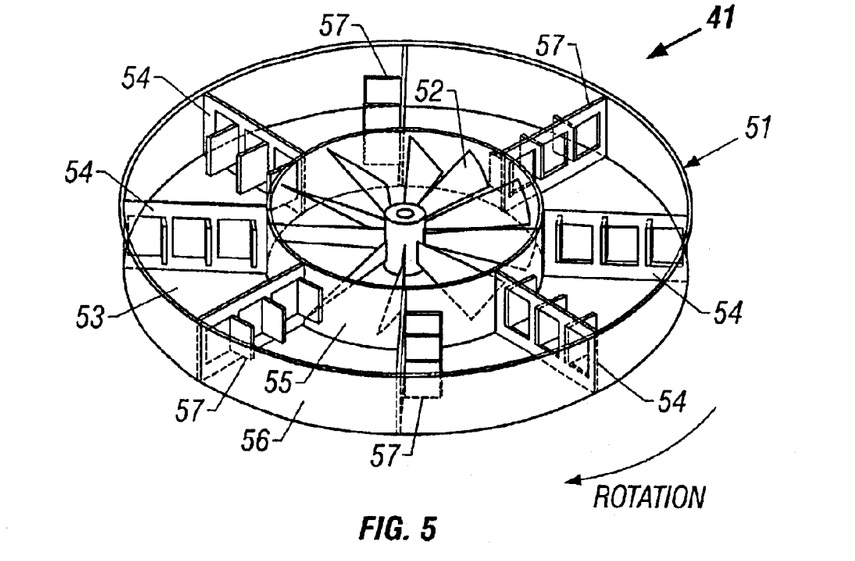
FIG. 5 is a perspective view of a fluid-filled flywheel suitable for use with the present invention.
Figure 7:
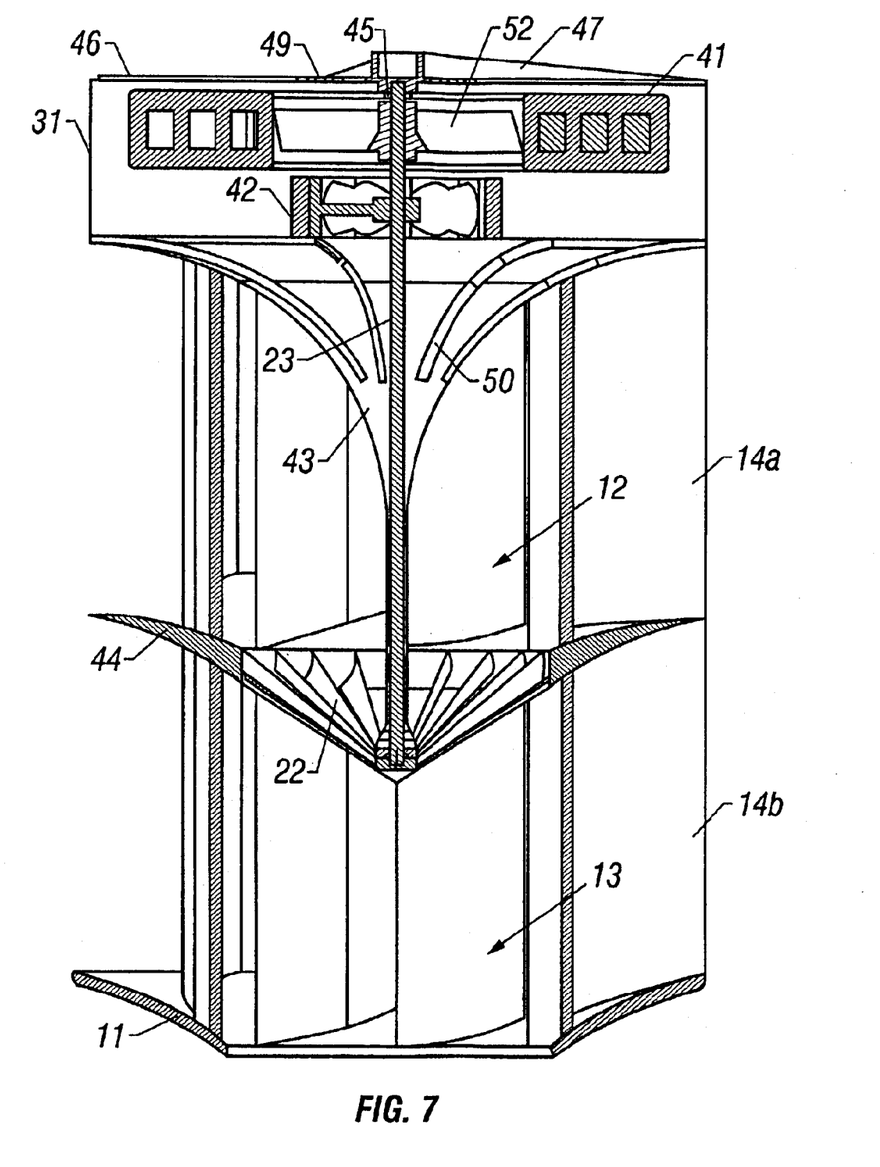
FIG. 7 is a cross-sectional view of an embodiment of the present invention that converts the energy of flowing water to electrical energy.

Referring briefly to FIG. 5, there is shown a perspective view of another embodiment of the flywheel 41. In this embodiment, the flywheel (shown in phantom) includes a hollow disk-shaped shell 51 that is filled with a fluid such as water. The design shown also includes a cooling fan 52 in the hub of the flywheel that rotates with the drive shaft 23 and the flywheel to produce a flow of cooling air that is used to cool the adjacent generator 42 (FIGS. 4 and 7). The placement of the fan in the hub of the flywheel creates an annular chamber 53 that holds the fluid. Within the chamber, there are a plurality of radial bulkheads 54 extending from the interior wall 55 to the exterior wall 56 of the chamber. Each of the radial bulkheads includes hinged gates or hatches 57. In the exemplary embodiment illustrated, each radial bulkhead includes three hinged gates.

During acceleration of the flywheel 41, the gates 57 open in the opposite direction of rotation. This allows the fluid to flow through the radial bulkheads 54, reducing startup inertia. The fluid then slowly comes up to speed due to friction with the interior and exterior walls 55 and 56 of the annular chamber, and due to the motion of the radial bulkheads through the fluid. During deceleration of the flywheel, the gates close because of the forward momentum of the fluid. This creates solid radial bulkheads and causes the flywheel to perform as a solid flywheel. The angular momentum of the flywheel then helps to maintain the angular velocity of the drive shaft 23 when the input power of the wind drops off.

Figure 6:
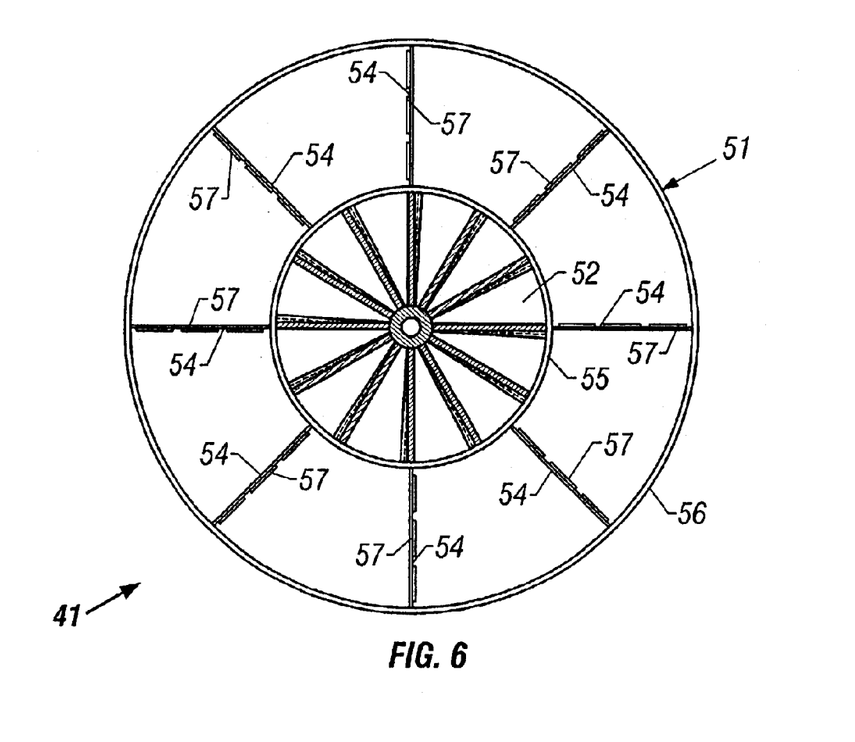
FIG. 6 is a top plan view of the fluid-filled flywheel of FIG. 5.

FIG. 6 is a top plan view of the fluid-filled flywheel 41 of FIG. 5, showing the blades of the cooling fan 52 in the hub of the flywheel, the annular chamber 53, the radial bulkheads 54, and the gates 57 in the closed (decelerating) position.

Thus, the fluid-filled flywheel 41 is particularly well suited for use with the energy conversion device 10 of the present invention. The fluid-filled flywheel allows rapid spin-up of the drive shaft 23 by reducing the start-up inertia, but resists deceleration like a solid flywheel. These features can significantly boost the efficiency of a wind-powered or water-powered device that operates with varying input power levels. By simply inverting the flywheel, the fluid-filled flywheel can be used with systems that spin either clockwise or counter-clockwise. As an additional feature, shipping weight is greatly reduced because the fluid can be added at the point of use.

Referring again to FIG. 4, an annular central divider (mid-deck) 44 divides the upstream annular chamber 12 from the downstream annular chamber 13. The top of the mid-deck slopes away from the turbine, causing the ambient wind entering the downstream annular chamber to flow downstream, away from the turbine. This creates an area of reduced air pressure on the downstream side of the turbine 22 that increases the flow of air from the upstream annular chamber 12 through the turbine. Each blade of the turbine 22 is a curved airfoil which receives rotational impetus from the rotation of the drive vortex, the reversal of the vortex direction, and aerodynamic lift that is generated by the airfoil in the direction of rotation of the turbine.

In the preferred embodiment of the present invention, the turbine 22 and flywheel 41 may be made of metal. Further, all metal parts may be coated with, for example, plastic, chrome, or paint to prevent corrosion. As discussed above, the flywheel may be a permanent magnet or may be a fluid-filled flywheel. All bearings such as bearing 45 may be magnetic-repulsion-levitation bearings so that there is no physical contact between the moving and stationary elements of the device. The base 31 may mount upon a support plate 46 and/or a support brace 47, depending on the structure on which the device is mounted and the orientation of the device.

The central drive shaft 23 may also drive the cooling fan 52 that draws cooling air through vents 49 in the support plate and directs the air through the generator 42. The heated air may exit through louvers 50 in the parabolic deck 43 of the upstream annular chamber 12 where it then mixes with the driving airflow in the upstream annular chamber to defrost the interior of the device and the turbine 22.

The device 10 may vary in its dimensions, depending upon the specific application for which it is utilized. For example, the dimensions of a wind-powered device that is mounted on the roof of a house may be between 40 inches and 48 inches in diameter, and between 60 inches and 78 inches in height. In this configuration, the turbine 22 has a diameter approximately one-half the diameter of the exterior of the cowling 11 (i.e., approximately 20–24 inches in diameter). Larger versions may be utilized for larger buildings such as factories or office buildings with increased economies of scale. For example, an office building may use a device that is 20 feet in diameter and 20 feet tall with a turbine that is 10 feet in diameter. A vehicle-mounted device (for example, for a passenger car), designed for high-wind conditions, may be about 24 inches in diameter and 6 inches in height. The generator and flywheel, if any, may be mounted inside the contour of the vehicle, or on a luggage rack. A small hydro-electric version of the device that is placed in a running stream or river may have similar dimensions to the vehicle-mounted device. In addition, since the outflow of the hydro-electric version is directed downward, a deflector may be utilized in shallow bodies of water to prevent erosion of the stream bed.

It should be noted that when the present invention is oriented vertically, the turbine 22, the generator 42, and the flywheel 41 rotate around a vertical axis. Therefore, the supporting structures are not subject to the vibration and stress produced by gravity effects in prior art devices in which propellers rotate around a horizontal axis. Moreover, exceptional wind-conversion efficiency is realized from the present invention as it diverts and accelerates the ambient wind flow into vortices that have several times the velocity of the ambient wind flow when they reach the turbine. Additionally, the acceleration of the air flow into the upstream and downstream annular chambers creates a low pressure area that pulls air into the device from an effective cross-sectional area that is greater than the physical cross-sectional area of the device. As a result, the present invention provides a new and improved wind-power conversion device which is quieter, safer, more efficient, and more cost effective than existing devices.

Referring now to FIG. 7, there is shown a cross-sectional view of an embodiment of the present invention that converts the energy of flowing water to electrical energy (i.e, a hydro-electrical device). There are three key differences between the hydro-electrical embodiment from the low-wind-powered embodiment of FIGS. 1–4. First, the upstream baffles 14a and the downstream baffles 14b curve in the same direction. The baffles therefore create two high-velocity vortices which rotate in the same direction. This is a more efficient design when the fluid flowing through the device is an incompressible fluid such as water. Second, the device operates more efficiently when it is inverted and mounted vertically since water vortices move downward due to the force of gravity. The third difference is the ratio of the height of the device to the diameter of the device. As noted above, the hydro-electric embodiment of the device may have a height that is shorter when compared to its diameter, and may have a height that is equal to or less than its diameter.

Figure 8:
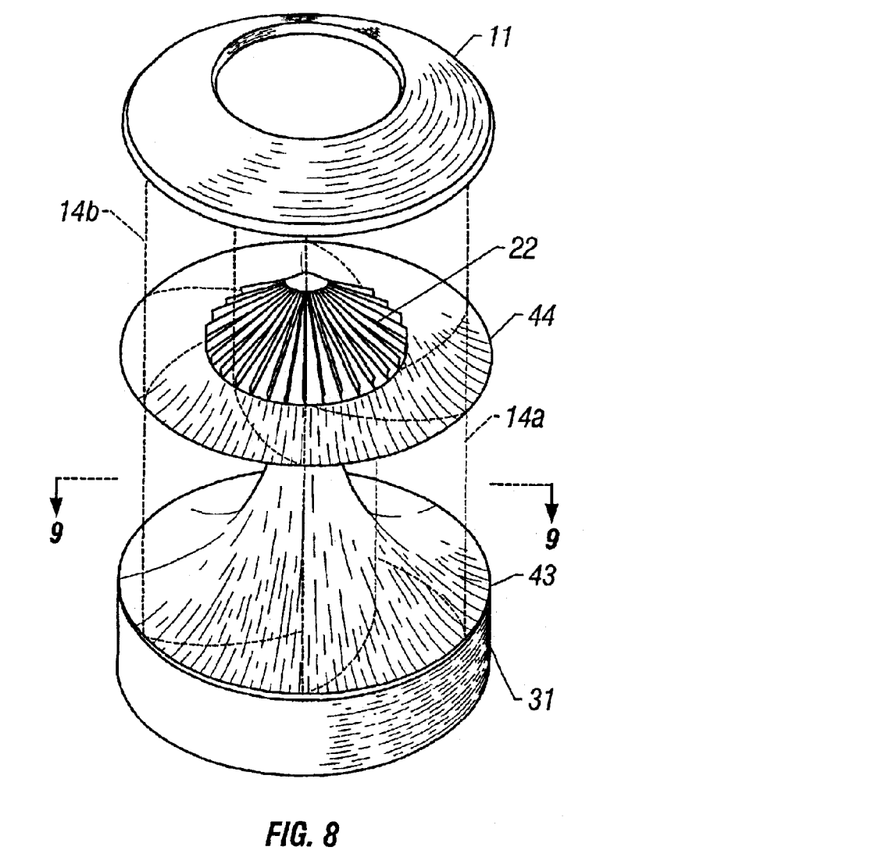
FIG. 8 is a perspective view of the embodiment of FIG. 1 with the longitudinal baffles drawn in phantom so that the annular central divider (mid-deck) and turbine can be seen.

FIG. 8 is a perspective view of the embodiment of FIG. 1 with the toroidal longitudinal baffles 14a and 14b drawn in phantom so that the annular central divider (mid-deck) 44 and turbine 22 can be seen.

Figure 9:
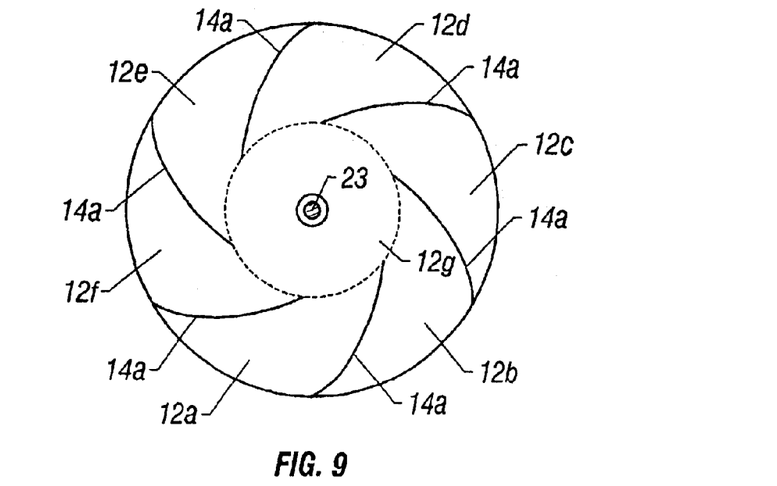
FIG. 9 is a horizontal cross-sectional view of the embodiment of FIG. 1 taken along line 9—9 of FIG. 8.

FIG. 9 is a horizontal cross-sectional view of the embodiment of FIG. 1 taken along line 9—9 of FIG. 8. In this view, it can be seen that the upstream annular chamber 12 is divided into a plurality of smaller chambers 12a through 12f by the toroidal longitudinal baffles 14a. The interior ends of the longitudinal baffles define a central vortex chamber 12g (illustrated by a dashed circle) in which the upstream vortex is formed, and from which the upstream vortex enters the turbine 22. The central vortex chamber 12g has a diameter approximately equal to the diameter of the turbine.

Figure 10:
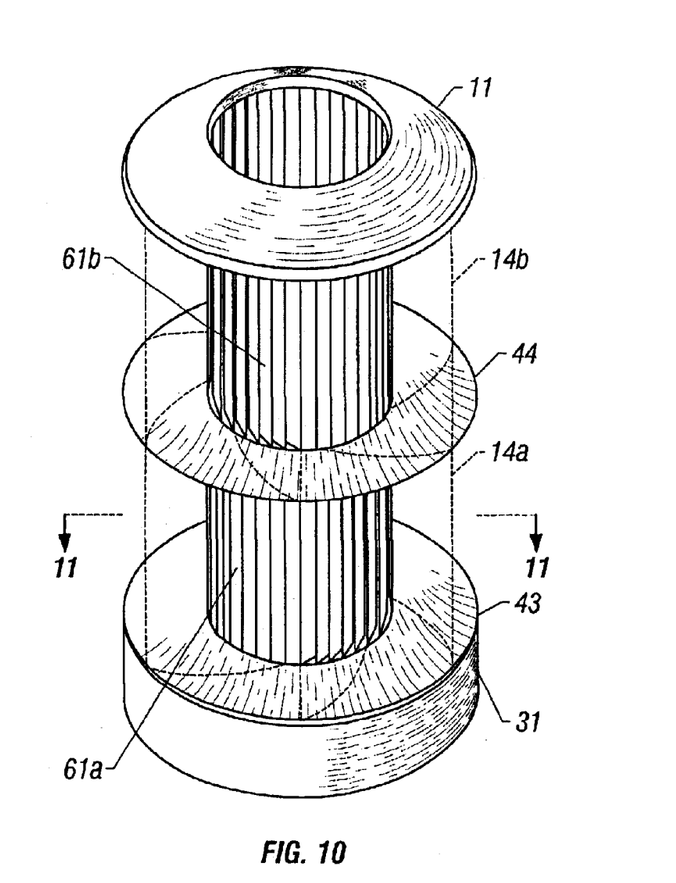
FIG. 10 is a perspective view of a second embodiment of the present invention that converts wind energy to mechanical or electrical energy, with the longitudinal baffles drawn in phantom so that a plurality of hinged longitudinal louvers can be seen.

FIG. 10 is a perspective view of a second embodiment of the present invention that converts wind energy to mechanical or electrical energy, with the longitudinal baffles 14a and 14b drawn in phantom so that a plurality of hinged longitudinal louvers 61a and 61b can be seen. The hinged louvers are mounted in the openings between the longitudinal baffles. The lovers may be mounted in a circular configuration anywhere from the outside edge of the longitudinal baffles to the inside edge of the baffles. In the embodiment illustrated, the louvers are longitudinally mounted at the inside edge of the baffles, around the perimeter of the central vortex chamber 12g. Each of the louvers is hinged on one side (i.e., the windward side as wind enters through the baffles) so that the louver may be opened toward the central vortex chamber by the force of the incoming wind. The width of each louver is slightly greater than the distance between louvers so that each louver slightly overlaps the hinged edge of the next louver. This prevents the louvers from opening outward.

Figure 11:
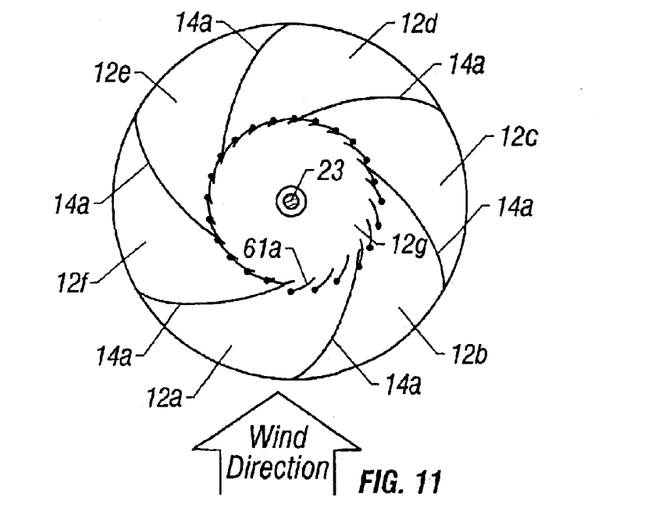
FIG. 11 is a horizontal cross-sectional view of the embodiment of FIG. 10 taken along line 11—11.

Referring briefly to FIG. 11, there is shown a horizontal cross-sectional view of the embodiment of FIG. 10 taken along line 11—11. In operation, wind blowing in the direction shown from the outside of the energy conversion device is funneled by the toroidal longitudinal baffles 14a into upstream chambers 12a and 12b. The baffles block the wind from entering the other chambers 12c through 12f. The wind flows through chambers 12a and 12b, and enters the central vortex chamber 12g by opening the hinged longitudinal louvers 61a that are mounted between the baffles in the openings defining chambers 12a and 12b. The remaining louvers remain closed, preventing the wind from exiting through the sides of the device. Thus, the wind-activated louvers are, in effect, one-way valves allowing the wind to flow into the central vortex chamber through the sides of the device, but only allowing the wind to exit through the top of the chamber, and through the turbine 22.

Referring again to FIG. 10, it can be seen that the longitudinal louvers 61a mounted in the upstream chamber 12 are hinged on the opposite side from the louvers 61b mounted in the downstream chamber 13. This is because the vortex in the downstream chamber rotates in the opposite direction from the vortex in the upstream chamber, and the downstream toroidal baffles 14b funnel the wind into the louvers 61b in the opposite direction. Like the louvers 61a in the upstream chamber 12, the louvers 61b in the downstream chamber 13 act as one-way valves allowing the wind to flow into the central vortex chamber through the sides of the device, but only allowing the wind to exit through the top of the chamber, and out of the device. This configuration helps to maintain the strength of both the upstream and the downstream vortices during operation of the device.

It should be recognized that some degree of improved energy-conversion performance may be obtained in a configuration in which there are toroidal baffles 14a and hinged louvers 61a only in the upstream annular chamber 12 because this ensures that all of the wind or other fluid entering the sides of the upstream chamber flows through the turbine. The addition of toroidal baffles 14b in the downstream annular chamber 13 provides additional improved performance, particularly when the direction of rotation of the downstream vortex is opposite the direction of the upstream vortex. Optimum energy-conversion performance is provided by a device having oppositely configured toroidal baffles 14a and 14b, and oppositely hinged louvers 61a and 61b, for both the upstream annular chamber 12 and the downstream annular chamber 13.

It is to be understood that even though numerous characteristics and advantages of the present invention have been set forth in the foregoing description, the disclosure is illustrative only, and changes may be made in detail, especially in matters of size, shape, and arrangement of parts within the principles of the invention to the full extent indicated by the broad general meaning of the terms in which the appended claims are expressed.

What is claimed is:

1. A fluid-powered energy conversion device for converting energy in a moving fluid into mechanical energy, said device comprising:

a rigid cylindrical frame having an upstream annular chamber and a downstream annular chamber, each of said chambers having sides that are open to allow entry of the moving fluid;

a first plurality of baffles longitudinally mounted in the upstream chamber that operate to create in the upstream chamber, an upstream drive vortex rotating in a first direction when the moving fluid enters the upstream chamber through the upstream chamber's open sides and through openings between the baffles;

a first plurality of hinged louvers positioned in the openings between the first plurality of baffles and encircling an upstream central vortex chamber centered around a central longitudinal axis of the device, said first plurality of louvers being operable to permit entry of the moving fluid into the upstream central vortex chamber only when the fluid is rotating in the first direction, and to prevent the fluid from exiting the upstream central vortex chamber through the sides of the device;

a floor of the upstream annular chamber that slopes toward the downstream chamber as the floor approaches the central longitudinal axis of the device, said floor causing the drive vortex to flow downstream through the upstream central vortex chamber and pass through a central aperture located between the upstream annular chamber and the downstream annular chamber;

a longitudinal drive shaft centrally mounted in the central aperture; and a turbine mounted on the drive shaft in the central aperture, said turbine being rotated by the drive vortex as the drive vortex passes through the central aperture.

2. The fluid-powered energy conversion device of claim 1 further comprising a second plurality of baffles longitudinally mounted in the downstream chamber that operate to create in the downstream chamber, a downstream extraction vortex rotating in a direction opposite to the first direction when the moving fluid enters the downstream chamber through the downstream chamber's open sides and through openings between the baffles, whereby the turbine is rotated by the drive vortex as the drive vortex passes through the turbine and reverses direction to match the direction of the extraction vortex.

3. The fluid-powered energy conversion device of claim 2 further comprising an annular central divider between the upstream chamber and the downstream chamber, said divider having a downstream surface that slopes downstream as it approaches the central longitudinal axis of the device, said downstream surface causing the extraction vortex to flow downstream, thereby creating an area of reduced fluid pressure downstream of the turbine.

4. The fluid-powered energy conversion device of claim 2 further comprising a second plurality of hinged louvers positioned in the openings between the second plurality of baffles and encircling a downstream central vortex chamber centered around the central longitudinal axis of the device, said second plurality of louvers being operable to permit entry of the moving fluid into the downstream central vortex chamber only when the fluid is rotating in the direction opposite to the first direction, and to prevent the fluid from exiting the downstream central vortex chamber through the sides of the device.

5. The fluid-powered energy conversion device of claim 4 wherein said first plurality of baffles are curved to form a toroidal pattern in the first direction, and said second plurality of baffles are curved to form a toroidal pattern in the direction opposite to the first direction.

6. The fluid-powered energy conversion device of claim 5 wherein said turbine comprises a plurality of rotating blades, each of said blades having a cross-sectional shape of a curved airfoil that generates a lift force, said lift force being directed in the direction of rotation of the turbine.

7. The fluid-powered energy conversion device of claim 1 further comprising a flywheel mounted on the drive shaft, said flywheel having sufficient mass to operate as an internal energy storage device due to its angular momentum.

8. The fluid-powered energy conversion device of claim 7 wherein said flywheel is a permanent magnet.

9. The fluid-powered energy conversion device of claim 7 wherein said flywheel is a fluid-filled flywheel that rotates with the drive shaft in a direction of rotation, said fluid-filled flywheel comprising:

a hollow disk-shaped shell filled with fluid; and a plurality of radial bulkheads that separate the interior of the shell into separate sections, each of said bulkheads having at least one gate pivotally mounted thereon to open in a direction opposite to the direction of rotation, said gate covering an aperture in the bulkhead when the gate is pivoted to a closed position, and said gate opening the aperture when the gate is pivoted to an open position;

whereby the gates are opened by the fluid when the flywheel accelerates in the direction of rotation, thus allowing the fluid to flow through the apertures in the bulkheads and reduce start-up inertia of the flywheel, and whereby the gates are closed by the fluid when the flywheel decelerates, thus preventing the fluid from flowing through the apertures, and causing the flywheel to maintain angular momentum like a solid flywheel.

10. The fluid-powered energy conversion device of claim 9 wherein the hollow disk-shaped shell includes:

an annular compartment filled with the fluid; and a cooling fan mounted in a central hub section of the shell.

11. The fluid-powered energy conversion device of claim 1 further comprising an electrical generator mounted on the drive shaft, said generator converting mechanical energy from the rotation of the shaft into electrical energy.

12. The fluid-powered energy conversion device of claim 11 further comprising a cooling fan mounted on the drive shaft, said cooling fan directing cooling air through the generator.

13. A wind-powered energy conversion device for converting wind energy into mechanical energy, said device comprising:

a rigid cylindrical frame having an upstream annular chamber, a downstream annular chamber, and an annular central divider between the upstream chamber and the downstream chamber, each of said chambers having sides that are open to allow entry of ambient wind, and said annular central divider having a central aperture therein and having a downstream surface that slopes downstream as it approaches a central longitudinal axis of the device;

a first plurality of baffles longitudinally mounted in the upstream chamber and curved to form a toroidal pattern that operates to create in an upstream central vortex chamber centered around a central longitudinal axis of the device, an upstream drive vortex rotating in a first direction when the ambient wind enters the upstream chamber through the upstream chamber's open sides and through openings between the baffles;

a first plurality of hinged louvers positioned in the openings between the first plurality of baffles and encircling the upstream central vortex chamber, said first plurality of louvers being operable to permit entry of the wind into the upstream central vortex chamber only when the wind is rotating in the first direction, and to prevent the wind from exiting the upstream central vortex chamber through the sides of the device;

a second plurality of baffles longitudinally mounted in the downstream chamber and curved to form a toroidal pattern operable to create in a downstream central vortex chamber centered around the central longitudinal axis of the device, a downstream extraction vortex rotating in a direction opposite to the first direction when the ambient wind enters the downstream chamber through the downstream chamber's open sides and through openings between the baffles;

a second plurality of hinged louvers positioned in the openings between the second plurality of baffles and encircling the downstream central vortex chamber, said second plurality of louvers being operable to permit entry of the wind into the downstream central vortex chamber only when the wind is rotating in the direction opposite to the first direction, and to prevent the wind from exiting the downstream central vortex chamber through the sides of the device;

a floor of the upstream annular chamber that slopes downstream as the floor approaches a central longitudinal axis of the device, said floor causing the drive vortex to flow downstream and pass through the central aperture in the annular central divider;

a longitudinal drive shaft centrally mounted in the central aperture; and a turbine mounted on the drive shaft in the central aperture, said turbine comprising a plurality of rotating blades, each of said blades having a cross-sectional shape of a curved airfoil that generates a lift force, said lift force being directed in the direction of rotation of the turbine, said turbine being rotated by the drive vortex as the drive vortex passes through the turbine and reverses direction to match the direction of the extraction vortex.

14. The wind-powered energy conversion device of claim 13 further comprising a flywheel mounted on the drive shaft, said flywheel having sufficient mass to operate as an internal energy storage device due to its angular momentum.

15. The wind-powered energy conversion device of claim 13 further comprising an electrical generator mounted on the drive shaft, said generator converting mechanical energy from the rotation of the shaft into electrical energy.

16. The wind-powered energy conversion device of claim 13 wherein the extraction vortex rotates in a counter-cyclonic direction so that the extraction vortex dissipates after it exits the downstream chamber.

17. A wind-powered energy conversion device for converting high-speed wind energy into mechanical energy, said device comprising:

a rigid cylindrical frame having an upstream annular chamber and a downstream annular chamber, each of said chambers having sides that are open to allow entry of the high-speed wind;

a first plurality of baffles longitudinally mounted in the upstream chamber that create in an upstream central vortex chamber, an upstream drive vortex rotating in a first direction when the high-speed wind enters the upstream chamber through the upstream chamber's open sides and through openings between the baffles;

a first plurality of hinged louvers positioned in the openings between the first plurality of baffles and encircling the upstream central vortex chamber, said first plurality of louvers being operable to permit entry of the wind into the upstream central vortex chamber only when the wind is rotating in the first direction, and to prevent the wind from exiting the upstream central vortex chamber through the sides of the device;

a second plurality of baffles longitudinally mounted in the downstream chamber that create in a downstream central vortex chamber, a downstream extraction vortex rotating in the first direction when the high-speed wind enters the downstream chamber through the downstream chamber's open sides and through openings between the baffles;

a second plurality of hinged louvers positioned in the openings between the second plurality of baffles and encircling the downstream central vortex chamber, said second plurality of louvers being operable to permit entry of the wind into the downstream central vortex chamber only when the wind is rotating in the first direction, and to prevent the wind from exiting the downstream central vortex chamber through the sides of the device;

a floor of the upstream annular chamber that slopes downstream as the floor approaches a central longitudinal axis of the device, said floor causing the drive vortex to flow downstream and pass through a central aperture located between the upstream annular chamber and the downstream annular chamber;

a longitudinal drive shaft centrally mounted in the central aperture; and a turbine mounted on the drive shaft in the central aperture, said turbine being rotated by the drive vortex as the drive vortex passes through the turbine.

18. The wind-powered energy conversion device of claim 17 further comprising a fluid-filled flywheel mounted on the drive shaft that rotates with the drive shaft in a direction of rotation, said fluid-filled flywheel comprising:

a hollow disk-shaped shell filled with fluid; and a plurality of radial bulkheads that separate the interior of the shell into separate sections, each of said bulkheads having at least one gate pivotally mounted thereon to open in a direction opposite to the direction of rotation, said gate covering an aperture in the bulkhead when the gate is pivoted to a closed position, and said gate opening the aperture when the gate is pivoted to an open position;

whereby the gates are opened by the fluid when the flywheel accelerates in the direction of rotation, thus allowing the fluid to flow through the apertures in the bulkheads and reduce start-up inertia of the flywheel, and whereby the gates are closed by the fluid when the flywheel decelerates, thus preventing the fluid from flowing through the apertures, and causing the flywheel to maintain angular momentum like a solid flywheel.

19. A water-powered energy conversion device for converting energy in a moving stream of water into mechanical energy, said device comprising:

a rigid cylindrical frame having an upstream annular chamber and a downstream annular chamber, each of said chambers having sides that are open to allow entry of the stream of water;

a first plurality of baffles longitudinally mounted in the upstream chamber that create in an upstream central vortex chamber, an upstream drive vortex rotating in a first direction when the stream of water enters the upstream chamber through the upstream chamber's open sides and through openings between the baffles;

a first plurality of hinged louvers positioned in the openings between the first plurality of baffles and encircling the upstream central vortex chamber, said first plurality of louvers being operable to permit entry of the water into the upstream central vortex chamber only when the water is rotating in the first direction, and to prevent the water from exiting the upstream central vortex chamber through the sides of the device;

a second plurality of baffles longitudinally mounted in the downstream chamber that create in a downstream central vortex chamber, a downstream extraction vortex rotating in the first direction when the stream of water enters the downstream chamber through the downstream chamber's open sides and through openings between the baffles;

a second plurality of hinged louvers positioned in the openings between the second plurality of baffles and encircling the downstream central vortex chamber, said second plurality of louvers being operable to permit entry of the water into the downstream central vortex chamber only when the water is rotating in the first direction, and to prevent the water from exiting the downstream central vortex chamber through the sides of the device;

a floor of the upstream annular chamber that slopes downstream as the floor approaches a central longitudinal axis of the device, said floor causing the drive vortex to flow downstream and pass through a central aperture located between the upstream annular chamber and the downstream annular chamber;

a longitudinal drive shaft centrally mounted in the central aperture; and a turbine mounted on the drive shaft in the central aperture, said turbine being rotated by the drive vortex as the drive vortex passes through the turbine.

20. The water-powered energy conversion device of claim 19 further comprising a fluid-filled flywheel mounted on the drive shaft that rotates with the drive shaft in a direction of rotation, said fluid-filled flywheel comprising:

a hollow disk-shaped shell filled with fluid; and a plurality of radial bulkheads that separate the interior of the shell into separate sections, each of said bulkheads having at least one gate pivotally mounted thereon to open in a direction opposite to the direction of rotation, said gate covering an aperture in the bulkhead when the gate is pivoted to a closed position, and said gate opening the aperture when the gate is pivoted to an open position;

whereby the gates are opened by the fluid when the flywheel accelerates in the direction of rotation, thus allowing the fluid to flow through the apertures in the bulkheads and reduce start-up inertia of the flywheel, and whereby the gates are closed by the fluid when the flywheel decelerates, thus preventing the fluid from flowing through the apertures, and causing the flywheel to maintain angular momentum like a solid flywheel.

21. A fluid-powered energy conversion device for converting energy in a moving fluid into mechanical energy, said device comprising:

a rigid cylindrical frame having an upstream annular chamber and a downstream annular chamber centered around a longitudinal axis, each of said chambers having sides that are open to allow entry of the moving fluid in a direction approximately perpendicular to the longitudinal axis, said upstream and downstream chambers being separated by an annular divider having a central aperture therein;

a longitudinal drive shaft centrally mounted along the longitudinal axis and passing through the central aperture;

a turbine mounted on the drive shaft in the central aperture;

means for creating in the upstream chamber an upstream drive vortex rotating in a first direction when the moving fluid enters the upstream chamber through the upstream chamber's open sides:

means for creating in the downstream chamber, a downstream extraction vortex rotating in a second direction opposite to the first direction when the moving fluid enters the downstream chamber through the downstream chamber's open sides; end means for causing the drive vortex to flow downstream and pass through the turbine, said turbine being rotated by the drive vortex as the drive vortex passes through the turbine and reverses direction to match the direction of the extraction vortex.

22. The fluid-powered energy conversion device of claim 21 wherein the means for creating an upstream drive vortex in the upstream chamber includes a first plurality of longitudinally mounted baffles having openings therebetween through which the moving fluid enters the upstream chamber, said first plurality of baffles being curved to form a toroidal pattern in the first direction.

23. The fluid-powered energy conversion device of claim 22 wherein the means for creating an upstream drive vortex in the upstream chamber includes a first plurality of hinged louvers positioned in the openings between the first plurality of baffles and encircling the upstream chamber, said first plurality of louvers being operable to permit entry of the moving fluid into the upstream chamber only when the fluid is rotating in the first direction, and to prevent the fluid from exiting the upstream chamber through the sides of the device.

24. The fluid-powered energy conversion device of claim 23 wherein the means for creating a downstream extraction vortex in the downstream chamber includes a second plurality of longitudinally mounted baffles having openings therebetween through which the moving fluid enters the upstream chamber, said second plurality of baffles being curved to form a toroidal pattern in the second direction.

25. The fluid-powered energy conversion device of claim 24 wherein the means for creating a downstream extraction vortex in the downstream chamber includes a second plurality of hinged louvers positioned in the openings between the second plurality of baffles and encircling the downstream chamber, said second plurality of louvers being operable to permit entry of the moving fluid into the downstream chamber only when the fluid is rotating in the second direction, and to prevent the fluid from exiting the downstream chamber through the sides of the device.

26. The fluid-powered energy conversion device of claim 25 wherein the means for causing the drive vortex to flow downstream includes means for creating a pressure differential in which the fluid pressure in the downstream chamber is less than the fluid pressure in the upstream chamber.

27. The fluid-powered energy conversion device of claim 26 wherein the means for creating a pressure differential includes a downstream surface of the annular divider that slopes downstream as it approaches the central longitudinal axis of the device, said downstream surface causing the extraction vortex to flow downstream, thereby creating an area of reduced fluid pressure downstream of the turbine.

28. The fluid-powered energy conversion device of claim 27 wherein the means for causing the drive vortex to flow downstream includes a floor of the upstream annular chamber that slopes toward the downstream chamber as the floor approaches the central longitudinal axis of the device, said floor causing the drive vortex to flow downstream and pass through the turbine.

29. The fluid-powered energy conversion device of claim 21 further comprising a fluid-filled flywheel that rotates with the drive shaft in a direction of rotation, said fluid-filled flywheel comprising:

a hollow disk-shaped shell filled with fluid: and a plurality of radial bulkheads that separate the interior of the shell into separate sections, each of said bulkheads having at least one gate pivotally mounted thereon to open in a direction opposite to the direction of rotation, said gate covering an aperture in the bulkhead when the gate is pivoted to a closed position, and said gate opening the aperture when the gate is pivoted to an open position;

whereby the gates are opened by the fluid when the flywheel accelerates in the direction of rotation, thus allowing the fluid to flow through the apertures in the bulkheads and reduce start-up inertia of the flywheel, and whereby the gates are closed by the fluid when the flywheel decelerates, thus preventing the fluid from flowing through the apertures, and causing the flywheel to maintain angular momentum like a solid flywheel.

* * * * *